US012762420B2

(12) United States Patent
Gautam

(10) Patent No.: US 12,762,420 B2
(45) Date of Patent: Oct. 13, 2026

(54) AUTO-GENERATION OF ACTIONABLE INFORMATION FOR BUSINESS PROCESS INSTANCES USING LARGE LANGUAGE MODELS (LLMS)

(71) Applicant: SAP SE, Walldorf (DE)

(72) Inventor: Prashant Gautam, Bangalore (IN)

(73) Assignee: SAP SE, Walldorf (DE)

( * ) Notice: Subject to any disclaimer, the term of this patent is extended or adjusted under 35 U.S.C. 154(b) by 364 days.

(21) Appl. No.: 18/676,080

(22) Filed: May 28, 2024

(65) Prior Publication Data

US 2025/0371364 A1 Dec. 4, 2025

(51) Int. Cl.
*G06N 3/091* (2023.01)

(52) U.S. Cl.
CPC .................................... *G06N 3/091* (2023.01)

(58) Field of Classification Search
None
See application file for complete search history.

(56) References Cited

U.S. PATENT DOCUMENTS

| | | | | |
|---|---|---|---|---|
| 11,327,826 | B1 * | 5/2022 | Shama | G06N 20/00 |
| 2012/0144376 | A1 * | 6/2012 | Van Eijndhoven | G06F 8/456 717/146 |
| 2012/0174016 | A1 * | 7/2012 | Biedenstein | G06F 8/71 715/772 |
| 2013/0041925 | A1 * | 2/2013 | Balko | G06F 8/656 707/810 |
| 2024/0152820 | A1 * | 5/2024 | Singh | G06N 20/00 |
| 2025/0371364 | A1 * | 12/2025 | Gautam | G06N 3/091 |

* cited by examiner

*Primary Examiner* — Peter Vincent Agustin
(74) *Attorney, Agent, or Firm* — Fountainhead Law Group, PC

(57) ABSTRACT

Techniques for automatically generating actionable information pertaining to business process instances using large language models (LLMs) are provided. In certain embodiments the information generated via these techniques can support participants of the business process instances, such as task owners and process managers, in taking actions and making decisions on the instances in accordance with their respective responsibilities.

20 Claims, 8 Drawing Sheets

AUTO-GENERATION OF ACTIONABLE INFORMATION FOR BUSINESS PROCESS INSTANCES USING LARGE LANGUAGE MODELS (LLMS)

BACKGROUND

A business process management (BPM) application is a software application that facilitates the execution of an organization's business processes. The lifecycle of a business process in a BPM application generally comprises two phases: a design phase and a runtime phase. During the design phase, one or more business experts model the business process using design tools provided by the BPM application. This modeling includes representing the business process as a workflow comprising a sequence of tasks, configuring the details of each task (e.g., description, due date, mechanism/conditions for completion, etc.), assigning certain tasks to human task owners (as needed), assigning a human process manager responsible for managing the overall business process, and so on. During the runtime phase, the BPM application executes instances of the business process in accordance with its designed model. This execution includes orchestrating the tasks of the business process workflow, such as routing tasks to their assigned owners or automatically running tasks that can be completed autonomously.

The human participants of a business process instance that is executed by a BPM application—namely, the task owners and process manager noted above, as well as BPM administrators—often need to look up various types of static and business process instance-specific information in order to carry out their respective duties. For example, a task owner that is assigned to approve an invoice in an invoice processing business process may need to determine the purpose of the invoice in order to make his/her approval decision. As another example, a manager or administrator of a business process instance that has stalled due to a technical error (e.g., failure to write to a backend data store) may need to refer to a BPM application troubleshooting guide in order to diagnose and resolve the error.

Currently, such information is not readily available to business process participants within the BPM application user interfaces (UIs) they interact with. As a result, the participants are typically forced to manually search for the information they need from other sources, which is time-consuming and burdensome. This is particularly problematic because in many cases the business process participants are managers, executives, or the like who have limited time to perform such manual searching.

DETAILED DESCRIPTION

Figure 1:
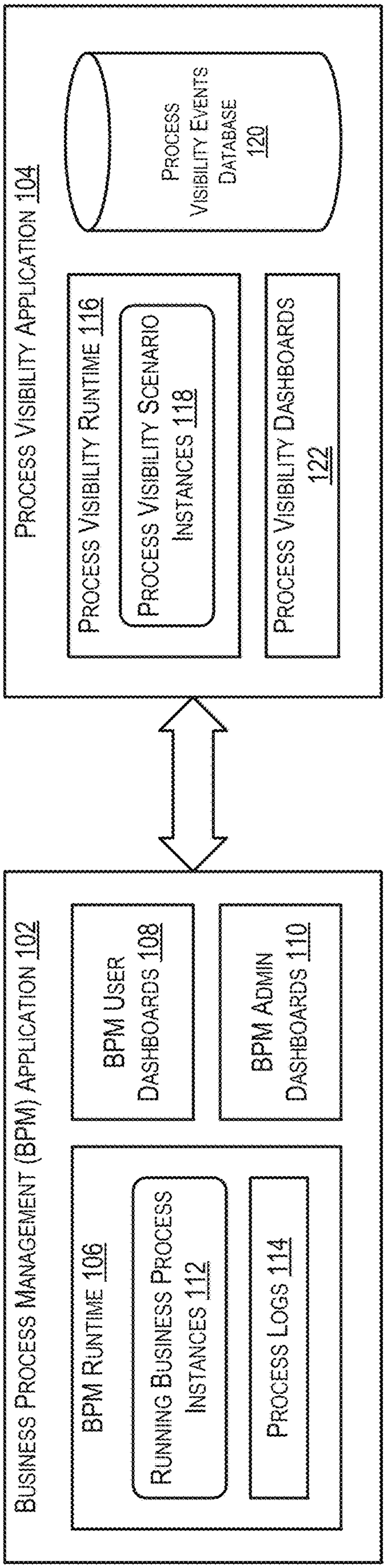
FIG. 1 depicts an example environment comprising a BPM application and a process visibility application according to certain embodiments.

In the following description, for purposes of explanation, numerous examples and details are set forth in order to provide an understanding of various embodiments. It will be evident, however, to one skilled in the art that certain embodiments can be practiced without some of these details or can be practiced with modifications or equivalents thereof.

Embodiments of the present disclosure are directed to a tool for automatically generating actionable information (e.g., insights, troubleshooting information, etc.) pertaining to business process instances executed by a BPM application, thereby supporting participants of those business process instances in acting and making decisions on the instances in accordance with their respective responsibilities. This automatic information generation is achieved by leveraging a large language model (LLM).

Generally speaking, the tool (referred to herein as process pilot) can collect both static and business process instance-specific information that are relevant to running business process instances and can store the collected information in a vector format (e.g., as embeddings), along with the original information text. The static information (or in other words, information not specific to a particular business process instance) can include, among other things, general help documentation, technical troubleshooting documentation, release notes, and/or customer support tickets related to the BPM application and/or the computing environment in which the BPM application is deployed. The business process instance-specific information (hereinafter referred to as simply instance-specific information) can include, among other things, log information, process visibility events, and/or user-uploaded documents for each running business process instance.

Process pilot can also detect errors and process visibility threshold violations that occur on running business process instances, as well as receive natural language queries from participants of the instances via a chatbot-like UI that is presented within one or more dashboards of the BPM application (and/or an associated process visibility application). Upon detecting an error/violation or receiving a participant-submitted query for a particular business process instance, process pilot can perform a semantic search of the error/violation/query text on the vectorized static and/or instance-specific information to identify text chunks from the collected information that are semantically relevant to the query/error/violation, build a prompt for an LLM that includes the error/violation/query text and the identified text chunks, and provide the prompt as input to the LLM. In response, the LLM can generate a natural language output that is responsive to the error, process visibility threshold violation, or query.

Process pilot can then present the LLM's natural language output to one or more participants of the business process instance, thereby aiding the participants in taking some action or making some decision on the instance. In embodiments where the LLM output is an answer to a natural language query submitted by a process participant, process pilot can present the output to the participant via the same chatbot UI used to submit the query. Alternatively, in embodiments where the LLM output is responsive to a detected error or process visibility threshold violation, process pilot can temporarily store the output. When a participant of the business process instance later accesses/views the instance via a BPM or process visibility dashboard, process pilot can retrieve and present the LLM output to the participant within that dashboard, along with the associated error or process visibility threshold violation. In this manner, process pilot can proactively provide business process participants with actionable information regarding detected errors and process threshold visibility violations (or in the words, without requiring the participants to explicitly ask for said information), thereby streamlining and accelerating the resolution of those problems.

1. Example Environment and Process Pilot Architecture

FIG. 1 is a simplified block diagram of an example environment 100 in which certain embodiments of the present disclosure may be implemented. As shown, environment 100 includes a BPM application 102 that is communicatively coupled with a process visibility application 104. Applications 102 and 104 may run on any type of computer system or set of computer systems known in the art, such as one or more servers in a public or private cloud.

As mentioned previously, BPM application 102 is a software application that facilitates the execution of an organization's business processes. Examples of such business processes include financial management business processes (e.g., invoice processing, payment processing, etc.), human resources business processes (e.g., employee onboarding/offboarding, payroll management, etc.), and so on. To that end, BPM application 102 includes a BPM runtime 106, a set of BPM user dashboards 108, and a set of BPM administrative (admin) dashboards 110. BPM runtime 106 is the execution engine of BPM application 102 and runs (i.e., orchestrates and automates) instances of various business processes modeled within application 102, shown via reference numeral 112. As part of its operation, BPM runtime 106 produces process logs 114 that track errors, events, and other informational data regarding the execution of running business process instances 112.

BPM user and admin dashboards 108 and 110 are UIs that enable the human participants of running business process instances 112 to access and manage their respective instances. In particular, each BPM user dashboard 108 is associated with a particular end-user of BPM application 102 and enables that end-user to view and act on the business process instance tasks that he/she has been assigned with. For example, the BPM user dashboard for a given end-user may present all of the running business process instances of which he/she is a participant and may display, for each instance, the outstanding tasks for which he/she is the task owner, along with UI controls for completing the tasks. Similarly, each BPM admin dashboard 110 is associated with a particular process manager or BPM administrator and enables that manager/administrator to review status and lifecycle information for running business process instances that he/she is responsible for. This status and lifecycle information can include, among other things, the current stage (i.e., task) that a given business process instance is at, whether any errors have been raised with respect to the instance, and so on.

Process visibility application 104 is a software application that provides process managers and administrators end-to-end operational visibility into the business process instances executed by BPM application 102 and other similar applications. Process visibility application 104 includes a process visibility runtime 116 comprising a number of process visibility scenario instances 118 mapped to running business process instances 112, a process visibility events database 120, and a set of process visibility dashboards 122. Each process visibility scenario instance 118 can be understood as a visibility meta model for its corresponding business process instance 112 that contains, among other things, (1) a data model of the instance's business process, including its process event types and process context attributes associated with those types, (2) visibility semantics that are relevant to the business process, including visibility attributes, visibility expression attributes, and process key performance indicators (KPIs) that are defined in terms of the process event types, process context attributes, visibility attributes, and/or visibility expression attributes, and (3) visibility data that is specific to the business process instance.

Process visibility events database 120 stores business process instance events (referred to as process visibility events) and associated process context pertaining to running business process instances 112 that process visibility application 104 receives from BPM application 102 as instances 112 are executed. Process visibility runtime 116 uses the process visibility events and process context maintained in database 120 to populate the visibility data of process visibility scenario instances 118.

Process visibility dashboards 122 are UIs that present, in a graphical format, the operational performance of running business process instances 112, in accordance with their corresponding process visibility scenario instances 118. For example, each process visibility dashboard 122 can display, to a particular process manager or administrator, various metrics, KPIs, and other information pertaining to the progress, health, and/or efficiency of the business process instances he/she is responsible for. These metrics and KPIs are derived from the visibility semantics and visibility data contained in the process visibility scenario instances for those business process instances.

As noted in the Background section, the participants of a business process instance that is executed by a BPM application like application 102 of FIG. 1 often need to access static and/or instance-specific information in order to carry out their respective duties via the application's dashboards (e.g., BPM user and admin dashboards 108 and 110). For example, a task owner that is presented with a task to approve an invoice via his/her BPM user dashboard 108 may need to determine the purpose of the invoice in order to approve or deny it. As another example, a process manager or BPM administrator that is presented with a technical error in a business process instance via his/her BPM admin dashboard 110 may need to find troubleshooting information in order to diagnose and resolve the error. However, there is currently no way for the participants to easily access such information within these dashboards at the time the information is needed (or in other words, at the time an action or decision needs to be taken).

Figure 2:
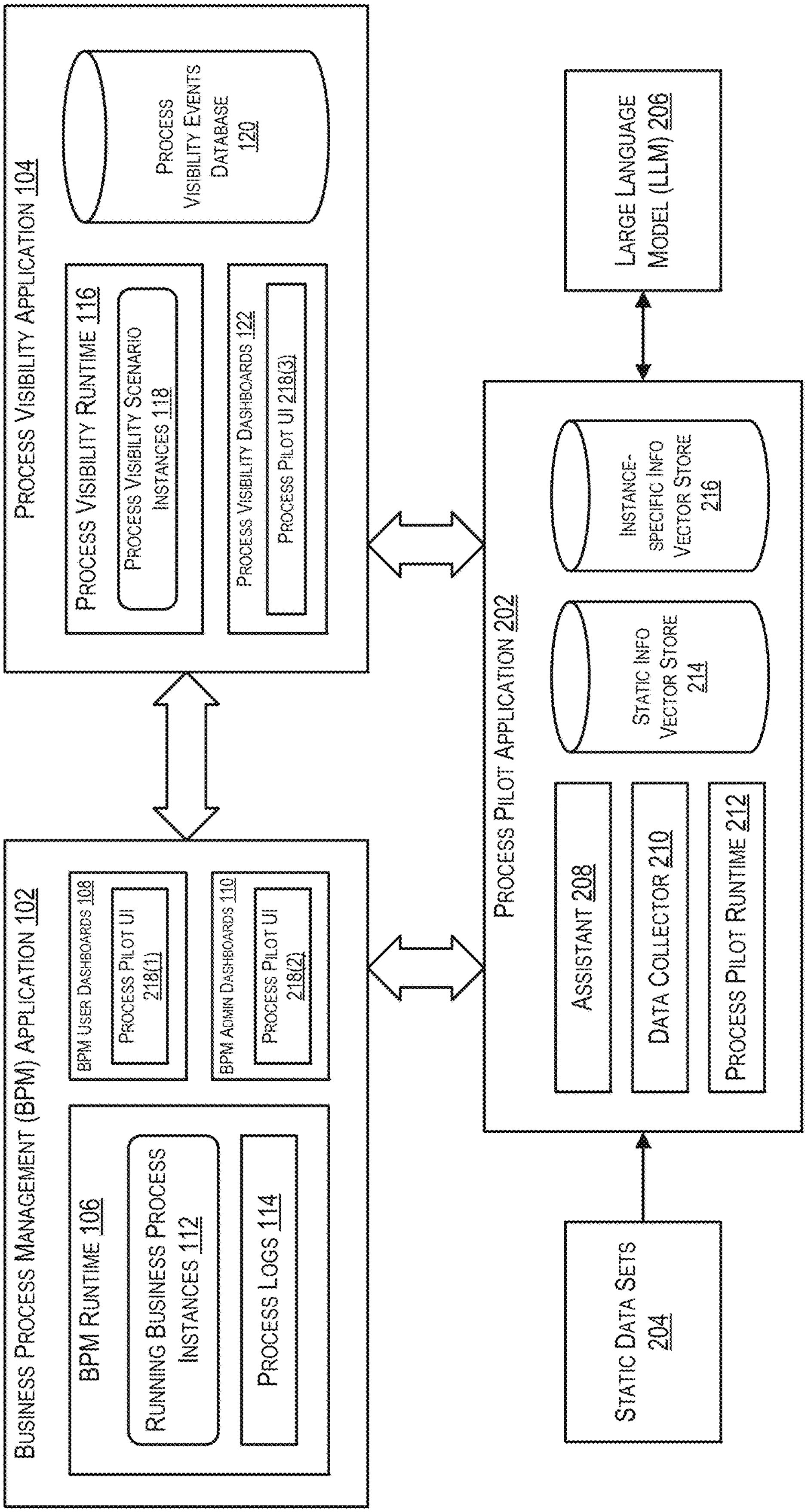
FIG. 2 depicts a version of the environment of FIG. 1 that implements a process pilot application according to certain embodiments.

To address this and other related issues, FIG. 2 depicts an enhanced version 200 of environment 100 of FIG. 1 that includes a novel process pilot application 202 according to certain embodiments of the present disclosure. Process pilot application 202 (hereinafter referred to as simply process pilot 202) is communicatively coupled with BPM application 102 and process visibility application 104, as well as with a set of static data sets 204 and an LLM 206. Static data sets 204 are data sets of static (i.e., non-business process instance-specific) information pertaining to BPM application 102 and/or the environment in which the application is deployed, such as general help documentation, technical troubleshooting documentation, application release notes, customer bug reports and tickets, and so on. For example, static data sets 204 may be held in one or more content management systems (CMSs) of an organization O that operates/deploys BPM application 102. LLM 206 is a type of generative artificial intelligence (AI) model that is trained on large textual datasets and can interpret and generate natural (human) language text. In one set of embodiments, LLM 206 may be a generic LLM that is trained on publicly available data such as data scraped from the Internet. In other embodiments, LLM 206 may be an organization-specific LLM that is trained, at least partially, on data that is proprietary to organization O.

As shown, process pilot 202 includes an assistant 208, a data collector 210, a process pilot runtime 212, a static information vector store 214, and an instance-specific information vector store 216. Assistant 208 is configured to present a set of process pilot UIs 218(1)-(3) within dashboards 108, 110, and 122 of BPM application 102 and process visibility application 104 respectively; these process pilot UIs can be chatbot UIs and/or informational UIs. Assistant 208 is also configured to mediate communication between process pilot UIs 218(1)-(3) and the other components of process pilot 202. For example, assistant 208 can receive a natural language query submitted by a process participant via one of the process pilot UIs and can pass this query for handling to process pilot runtime 212. As another example, assistant 208 can receive messages generated by process pilot runtime 212 and present these messages within process pilot UIs 218(1)-(3).

Data collector 210 is configured to periodically collect the static information held in static data sets 204, convert the collected static information into vectors (known as embeddings), and store the collected static information with its corresponding embeddings in static information vector store 214. Data collector 210 can perform this static information collection automatically according to a predefined interval (e.g., once a month) or on demand. For example, an administrator may instruct data collector 210 to perform static information collection each time a new version of BPM application 102 is released, which typically entails updates to the help documentation, troubleshooting documentation, and release notes held in static data sets 204. If only a subset of the information in static data sets 204 has changed since the last collection activity, data collector 210 can carry out this static information collection only on that changed subset (or in other words, only on the delta changes in static data sets 204).

Data collector 210 is also configured to collect instance-specific information pertaining to running business process instances 112, convert the collected instance-specific information into embeddings, and store the collected instance-specific information with its corresponding embeddings in instance-specific information vector store 216. Instance-specific information is information that is specific to a particular business process instance. The timing of this instance-specific data collection and the types of information collected can differ in various scenarios and embodiments. For example, in one set of embodiments data collector 210 can collect instance-specific information in response to the occurrence of an error or a process visibility threshold violation with respect to a running business process instance 112. As used herein, a process visibility threshold violation is a violation of a KPI threshold that has been defined within the process visibility scenario instance of the business process instance. In these embodiments, the collected instance-specific information can comprise log information and process visibility events related to the business process instance from BPM application 102's process logs 114 and process visibility application 104's events database 120 respectively. In another set of embodiments, data collector 210 can collect instance specific information in response to receiving a notification that a user (e.g., process participant) has uploaded one or more electronic documents that are related to a running business process instance 112 to BPM application 102. In these embodiments, the collected instance-specific information can comprise the uploaded documents.

Finally, process pilot runtime 212 is configured to (1) detect an error or process visibility threshold violation with respect to a running business process instance 112 (or receive a natural language query from a process participant via a process pilot UI 218); (2) perform a semantic search of the error/violation/query text against static and/or instance-specific vector stores 214 and 216, resulting in identification of portions of the collected static and/or instance-specific information that are semantically relevant to the error/violation/query (and thus may be useful in understanding and addressing the error/violation or in answering the query); (3) build an LLM prompt that includes both the error/violation/query text and the identified portions of collected information; (4) provide the LLM prompt as input to LLM 206, resulting in a natural language output from LLM 206 that is responsive to the error/violation/query; and (5) cause the LLM output to be presented to one or more participants of the business process instance in an appropriate manner.

Figure 3:
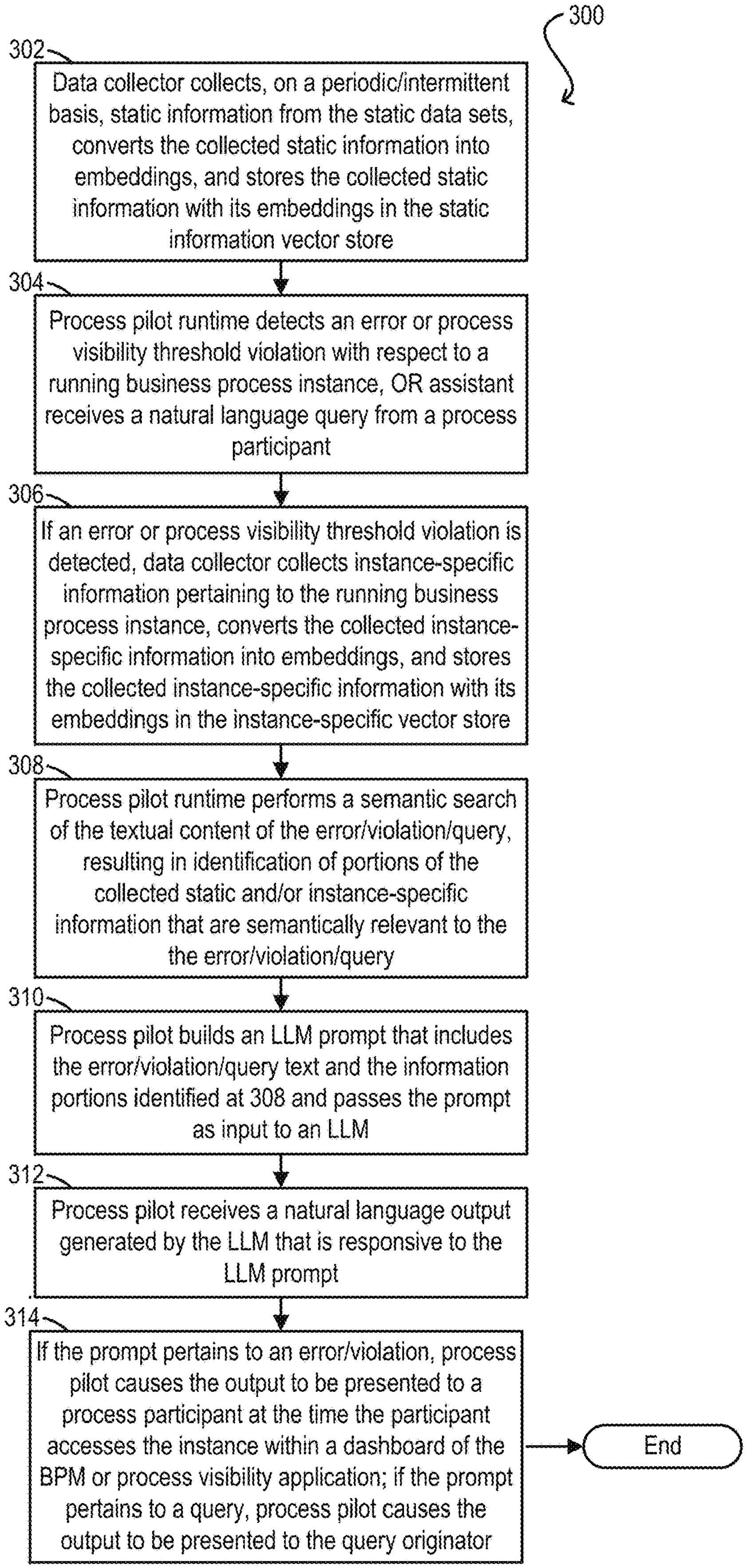
FIG. 3 depicts a high-level process pilot workflow according to certain embodiments.

As an illustrative example, FIG. 3 depicts a high-level workflow 300 that may be performed by components 208-218 of process pilot 202 according to certain embodiments. Starting with step 302, data collector 210 can collect on, a periodic/intermittent basis, static information from static data sets 204, convert the collected static information into embeddings, and store the collected static information and its corresponding embeddings in static information vector store 214. As mentioned previously, this static information collection may be carried out according to a predefined schedule or on demand, such as in response to the release of a new version of BPM application 102.

At step 304, process pilot runtime 212 can detect that an error or a process visibility threshold violation has been raised with respect to a running business process instance 112. One example of an error is failure in execution of a running business process instance 112; in this case, a failed process event is raised and stored in a data store of business process management application 102. One example of a process visibility threshold violation is a scenario in which a critical task of the instance has not been completed after a predefined threshold (e.g., a predefined number of hours/days or some other configured period). Alternatively, assistant 108 can receive, via one of process pilot UIs 218(1)-(3), a natural language query submitted by a participant of a running business process instance 112, such as a task owner, the process manager, or a BPM administrator.

In the case where an error or a process visibility threshold violation is detected at 304, data collector 210 can collect instance-specific information pertaining to the running business process instance 112, convert the collected instance-specific information into embeddings, and store the collected instance-specific information and its corresponding embeddings in instance-specific information vector store 216 (step 306). The instance-specific information collected at 306 can include, among other things, log information from process logs 114 and events from process visibility events database 120 that are associated with the instance. In certain embodiments, as part of step 306, data collector 210 can provide the collected instance-specific information to an LLM (such as LLM 206) or order to identify the business domain (e.g., finance, human resources (HR), etc.) to which the affected business process instance belongs. Data collector 210 can then create a domain-specific knowledge graph for the identified business domain, create knowledge graph embeddings from the knowledge graph, and store the embeddings in instance-specific vector store 216.

Process pilot runtime 212 can then perform a semantic search of the textual content of the error, process visibility threshold violation, or natural language query on static and/or instance-specific vector stores 214 and 216, resulting in the identification of portions of the collected static and/or instance-specific information that are semantically relevant to the error/violation/query (step 308). This can involve, e.g., computing an embedding of the error/violation/query text, computing a mathematical distance (e.g., cosine distance) between the error/violation/query embedding and the embeddings stored in vector stores 214 and 216, and identifying the embeddings that are closest in distance to the error/violation/query embedding.

Upon completing the semantic search, process pilot runtime 212 can build an LLM prompt that includes both the error/violation/query text and the information portions identified at 308 and can pass the prompt as input to LLM 206 (step 310). For example, the LLM prompt can ask LLM 206 to provide potential solutions or troubleshooting steps for the error/violation or an answer to the query, using the identified portions as context.

At step 312, process pilot runtime 212 can receive a natural language output generated by LLM 206 that is responsive to the LLM prompt. Finally, at step 314, process pilot runtime 212 can take an appropriate action on the received output, depending on whether the LLM prompt pertains to a detected error/violation or a participant-submitted query. If the LLM prompt pertains to a detected error or process visibility threshold violation, process pilot runtime 212 can temporarily save the output. Process pilot runtime 212 can later cause the output to be presented within process pilot UI 218(2) to a process manager or administrator that accesses the business process instance using a BPM admin dashboard 110 (in the case of an error), or within process pilot UI 218(3) to a process manager or administrator that accesses a visibility scenario instance of the business process instance using a process visibility dashboard 122 (in the case of a process visibility violation).

Alternatively, if the LLM prompt pertains to a participant-submitted query, process pilot runtime 212 can simply cause the output to be presented to the query originator via the process pilot UI 218 used to submit the query.

With the foregoing architecture and high-level workflow, process pilot 202 enables/achieves a number of advantages. First, by generating actionable insights, troubleshooting information, and so on based on the static and instance-specific information collected in vector stores 214 and 216 and by presenting the generated information to process participants within dashboards 108, 110, and 122, process pilot 202 eliminates the need for the participants to manually search for that information in order to carry out their assigned responsibilities/duties, thereby saving them time and effort. This in turn leads to faster business process instance completions.

Second, by automatically detecting errors or process visibility threshold violations raised on business process instances, generating potential solutions/troubleshooting steps relevant to those errors/violations, and proactively displaying the potential solutions/troubleshooting steps to process participants when they access the instances via the BPM and process visibility dashboards, process pilot 202 significantly streamlines and accelerates the resolution of those errors and violations.

The remaining sections of this disclosure provide additional details regarding the operation of data collector 210 and process pilot runtime 212 according to certain embodiments. It should be appreciated that the process pilot architecture shown in FIG. 2 and high-level workflow 300 shown in FIG. 3 are illustrative and not intended to limit embodiments of the present disclosure. For example, although not depicted in workflow 300, in some embodiments data collector 210 can carry out a separate instance-specific information collection workflow for electronic documents that are uploaded by process participants to BPM application 102. This document collection workflow is detailed in section (4) below.

Further, although workflow 300 indicates that data collector 210 only collects instance-specific information for a given business process instance in response to detecting an error or a process visibility threshold violation on that instance, in some embodiments data collector 210 may also perform this processing in response to participant-submitted queries (for example, queries that require instance-specific information in order to be properly answered).

Yet further, while FIG. 2 depicts a particular arrangement of components in environment 200, other arrangements are possible (e.g., the functionality attributed to a particular component may be split into multiple components, components may be combined or integrated into other components, and so on). For example, in some embodiments process pilot 202 may be integrated into BPM application 102 rather than being a standalone application.

2. Static Information Collection

Figure 4:
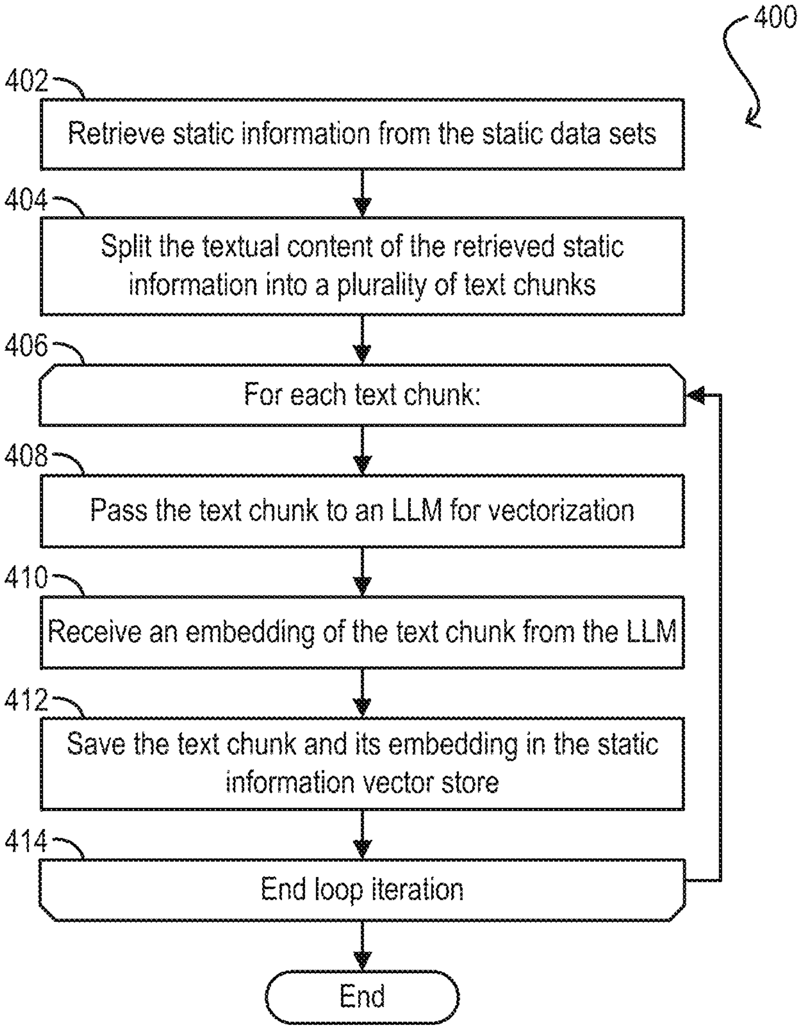
FIG. 4 depicts a static information collection workflow according to certain embodiments.

FIG. 4 depicts a workflow 400 that may be performed by data collector 210 of process pilot 202 for collecting static information and populating this information with its embeddings in static information vector store 214 according to certain embodiments.

Starting with steps 402 and 404, data collector 210 can retrieve static information (e.g., web pages, documents, etc.) from static data sets 204 and can split the textual content of the retrieved static information into a plurality of text chunks. Data collector 210 may use any known text chunking algorithm for this purpose.

At step 406, data collector 210 can enter a loop for each text chunk created at 404. Within the loop, data collector 210 can pass the text chunk to LLM 206 for vectorization (step 408). In response, data collector 210 can receive an embedding of the text chunk from the LLM, where the embedding is a vector-based representation of the text chunk that preserves certain aspects of the text chunk's original meaning (step 410).

Data collector 210 can then save the text chunk with its embedding in static information vector store 214 (step 412), reach the end of the current loop iteration (step 414), and return to step 406 in order to process the next text chunk. Upon processing all text chunks in this manner, the workflow can end.

3. Instance-Specific Information Collection

Figure 5:
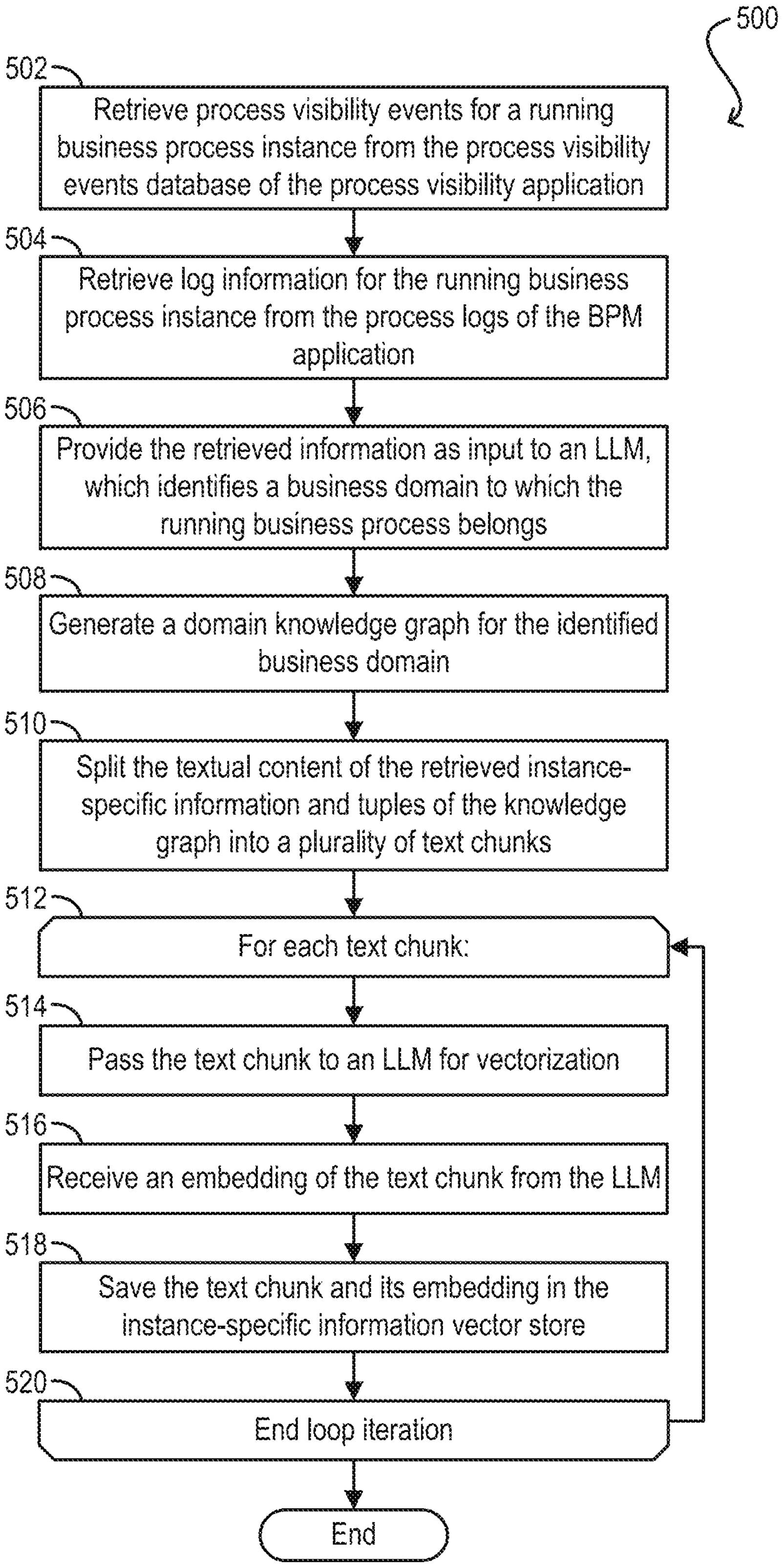
FIG. 5 depicts an instance-specific information collection workflow according to certain embodiments.

FIG. 5 depicts a workflow 500 that may be performed by data collector 210 for collecting instance-specific information for a running business process instance 112 and populating this information with its embeddings in instance-specific information vector store 216 according to certain embodiments. As discussed with respect to workflow 300 of FIG. 3, this instance-specific information collection may be initiated in response to detection of an error or a process visibility threshold violation on the instance.

Starting with step 502, data collector 210 can retrieve process visibility events for the running business process instance from database 120 of process visibility application 104. These process visibility events are events generated by BPM runtime 106 during the course of execution of the business process instance, such as an event indicating the start of the instance, an event indicating the initiation or completion of a task, and so on.

In addition, at step 504, data collector 210 can retrieve log information for the running business process instance from process logs 114 of BPM application 102. This log information can include error logs and other informational data regarding the execution of the instance.

Upon retrieving the process visibility events and process logs, data collector 210 can provide this information as input to an LLM (either LLM 206 or a different LLM), which can identify a business domain that best matches the running business process instance based on the provided information (step 506). Data collector 210 can further generate a domain knowledge graph for the identified domain (step 508). Data collector 210 can then split the textual content of the collected instance-specific information and the textual content (e.g., tuples) of the generated knowledge graph into a plurality of text chunks (step 510). Data collector 210 may use any known text chunking algorithm for this purpose.

At step 512, data collector 210 can enter a loop for each text chunk created at 510. Within the loop, data collector 210 can pass the text chunk to LLM 206 for vectorization (step 514). In response, data collector 210 can receive an embedding of the text chunk from the LLM, where the embedding is a vector-based representation of the text chunk that preserves certain aspects of the text chunk's original meaning (step 516).

Data collector 210 can then save the text chunk with its embedding in information-specific information vector store 216 (step 518), reach the end of the current loop iteration (step 520), and return to step 512 in order to process the next text chunk. Upon processing all text chunks in this manner, the workflow can end.

4. Uploaded Document Collection

Figure 6:
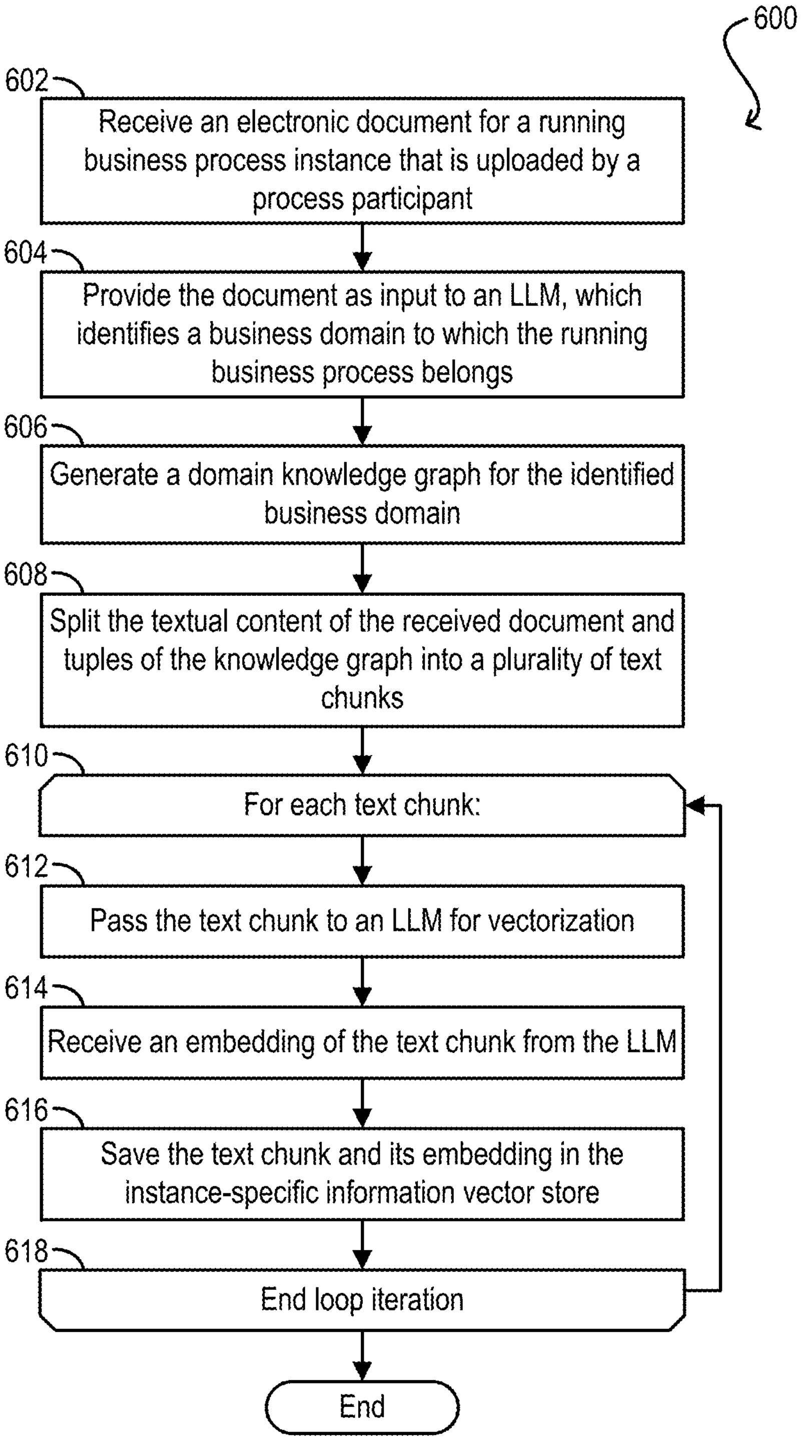
FIG. 6 depicts an uploaded document collection workflow according to certain embodiments.

FIG. 6 depicts a workflow 600 that may be executed by data collector 210 for collecting an electronic document that have been uploaded to BPM application 102 for a running business process instance 112 and populating this information with its embeddings in instance-specific information vector store 216 according to certain embodiments. Data collector 210 may execute workflow 600 at the time the document is uploaded by a user (e.g., process participant) or at a later time. In this latter case, data collector 210 can retrieve the uploaded document from, e.g., a document repository of BPM application 102.

Starting with step 602, data collector 210 can receive an electronic document that has been uploaded by a participant of the running business process instance. At step 604, data collector 210 can provide the document as input to an LLM (either LLM 206 or a different LLM), which can identify a business domain that best matches the running business process instance based on the provided document. Data collector 210 can further generate a domain knowledge graph for the identified domain (step 606). Data collector 210 can then split the textual content of the retrieved document and the textual content (e.g., tuples) of the generated knowledge graph into a plurality of text chunks (step 608). Data collector 210 may use any known text chunking algorithm for this purpose.

At step 610, data collector 210 can enter a loop for each text chunk created at 608. Within the loop, data collector 210 can pass the text chunk to LLM 206 for vectorization (step 612). In response, data collector 210 can receive an embedding of the text chunk from the LLM, where the embedding is a vector-based representation of the text chunk that preserves certain aspects of the text chunk's original meaning (step 614).

Data collector 210 can then save the text chunk with its embedding in instance-specific information vector store 216 (step 616), reach the end of the current loop iteration (step 618), and return to step 610 in order to process the next text chunk. Upon processing all text chunks in this manner, the workflow can end.

5. Runtime Handling of Errors/Violations/Queries

Figure 7:
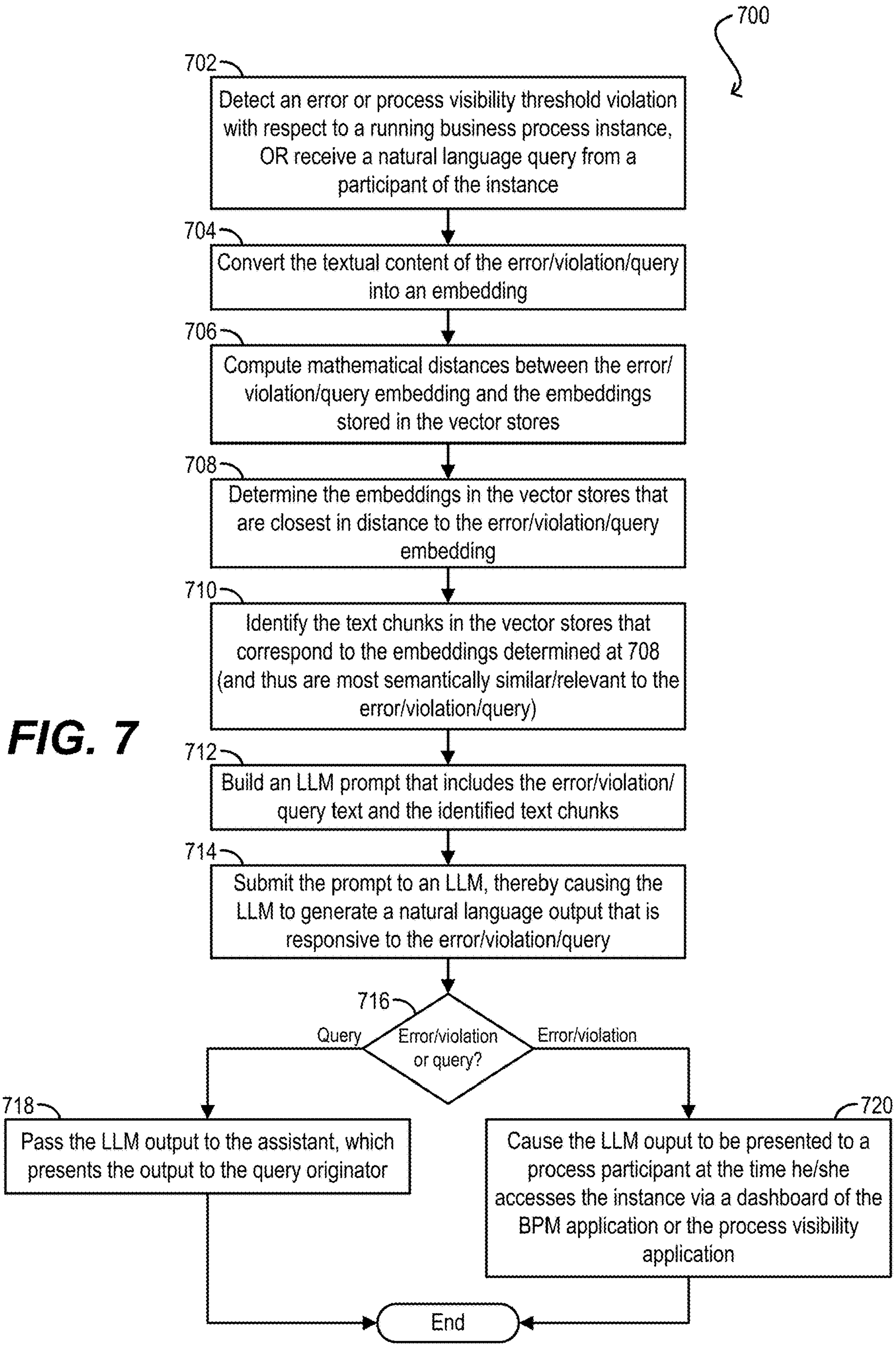
FIG. 7 depicts an error/violation/query handling workflow according to certain embodiments.

FIG. 7 depicts a workflow 700 that may be executed by process pilot runtime 212 for handling a detected error/violation or a participant-submitted natural language query for a running business process instance 112 according to certain embodiments.

Starting with step 702, process pilot runtime 212 can detect an error or a process visibility threshold violation with respect to the running business process instance, or alternatively receive a natural language query submitted by a participant of the instance (e.g., task owner, process manager, or BPM administrator).

At steps 704-708, process pilot runtime 212 can convert the textual content of the error, violation, or query into an embedding, compute mathematical (e.g., cosine) distances between the error/violation/query embedding and the embeddings stored in vector stores 214 and 216, and determine the embeddings in the vector stores that are closest in distance to the error/violation/query embedding (e.g., the top K closest embeddings).

At step 710, process pilot runtime 212 can identify the text chunks in vector stores 214 and 216 that correspond to the embeddings determined at 708 and thus are most semantically similar/relevant to the error, process visibility threshold violation, or natural language query. Process pilot runtime 212 can then build an LLM prompt that includes both the error/violation/query text and the identified text chunks (step 712). For example, in the case of an error or violation, the created prompt can include a request for potential solutions and/or troubleshooting steps for addressing the error or violation, in view of the provided text chunks. In the case of a query, the created prompt can include a request for an answer to the query, in view of the provided text chunks.

Upon building the LLM prompt, process pilot runtime 212 can submit it to LLM 206, thereby causing the LLM to generate a natural language output that is responsive to the error, violation, or query (step 714). Process pilot runtime 212 can thereafter receive the LLM output and process it accordingly. For example, in the case of a query, process pilot runtime 212 can pass the LLM output to assistant 208, which can in turn present the output to the query originator in the process pilot UI where the query was originally submitted (steps 716 and 718).

In the case of an error or violation, process pilot runtime 212 can cause the LLM output to the presented to a participant of the running business process at a time the participant accesses the instance via a dashboard of BPM application 102 or process visibility application 104 (steps 716 and 720). For example, in the case of an error, process pilot runtime 212 can cause the LLM output to be presented to a process manager or administrator at the time he/she accesses the instance via his/her BPM admin dashboard 110. Alternatively, in the case of a process visibility threshold violation, process pilot runtime 212 can cause the LLM output to be presented to a process manager or administrator at the time he/she accesses the instance via his/her process visibility dashboard 122.

6. Example Computer System

Figure 8:
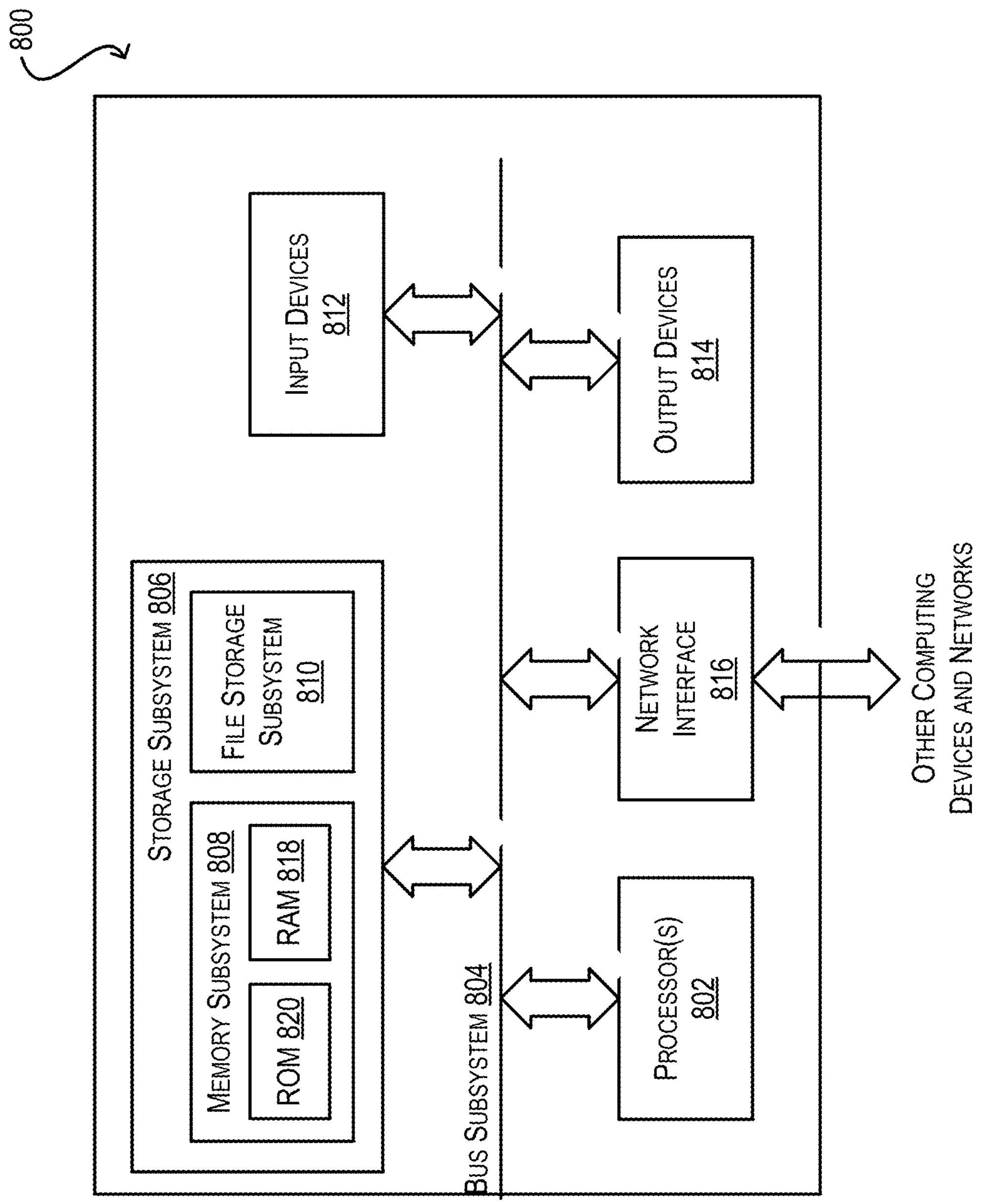
FIG. 8 depicts an example computer system according to certain embodiments.

FIG. 8 is a simplified block diagram of an example computer system 800 according to certain embodiments. Computer system 800 (and/or equivalent systems/devices) may be used to run any of the software applications described in the foregoing disclosure, including process pilot 202 and its constituent components. As shown in FIG. 8, computer system 800 includes one or more processors 802 that communicate with a number of peripheral devices via a bus subsystem 804. These peripheral devices include a storage subsystem 806 (comprising a memory subsystem 808 and a file storage subsystem 810), user interface input devices 812, user interface output devices 814, and a network interface subsystem 816.

Bus subsystem 804 can provide a mechanism for letting the various components and subsystems of computer system 800 communicate with each other as intended. Although bus subsystem 804 is shown schematically as a single bus, alternative embodiments of the bus subsystem can utilize multiple buses.

Network interface subsystem 816 can serve as an interface for communicating data between computer system 800 and other computer systems or networks. Embodiments of network interface subsystem 816 can include, e.g., an Ethernet module, a Wi-Fi and/or cellular connectivity module, and/or the like.

User interface input devices 812 can include a keyboard, pointing devices (e.g., mouse, trackball, touchpad, etc.), a touch-screen incorporated into a display, audio input devices (e.g., voice recognition systems, microphones, etc.), motion-based controllers, and other types of input devices. In general, use of the term "input device" is intended to include all possible types of devices and mechanisms for inputting information into computer system 800.

User interface output devices 814 can include a display subsystem and non-visual output devices such as audio output devices, etc. The display subsystem can be, e.g., a transparent or non-transparent display screen such as a liquid crystal display (LCD) or organic light-emitting diode (OLED) display that is capable of presenting 2D and/or 3D imagery. In general, use of the term "output device" is intended to include all possible types of devices and mechanisms for outputting information from computer system 800.

Storage subsystem 806 includes a memory subsystem 808 and a file/disk storage subsystem 810. Subsystems 808 and 810 represent non-transitory computer-readable storage media that can store program code and/or data which provide the functionality of embodiments of the present disclosure in a non-transitory state.

Memory subsystem 808 includes a number of memories including a main random access memory (RAM) 818 for storage of instructions and data during program execution and a read-only memory (ROM) 820 in which fixed instructions are stored. File storage subsystem 810 can provide persistent (i.e., non-volatile) storage for program and data files, and can include a magnetic or solid-state hard disk drive, an optical drive along with associated removable media (e.g., CD-ROM, DVD, Blu-Ray, etc.), a removable or non-removable flash memory-based drive, and/or other types of non-volatile storage media known in the art.

It should be appreciated that computer system 800 is illustrative and other configurations having more or fewer components than computer system 800 are possible.

The above description illustrates various embodiments of the present disclosure along with examples of how aspects of these embodiments may be implemented. The above examples and embodiments should not be deemed to be the only embodiments and are presented to illustrate the flexibility and advantages of the present disclosure as defined by the following claims. For example, although certain embodiments have been described with respect to particular workflows and steps, it should be apparent to those skilled in the art that the scope of the present disclosure is not strictly limited to the described workflows and steps. Steps described as sequential may be executed in parallel, order of steps may be varied, and steps may be modified, combined, added, or omitted. As another example, although certain embodiments may have been described using a particular combination of hardware and software, it should be recognized that other combinations of hardware and software are possible, and that specific operations described as being implemented in hardware can also be implemented in software and vice versa.

The specification and drawings are, accordingly, to be regarded in an illustrative rather than restrictive sense. Other arrangements, embodiments, implementations, and equivalents will be evident to those skilled in the art and may be employed without departing from the spirit and scope of the present disclosure as set forth in the following claims.

What is claimed is:

1. A method performed by one or more computer systems, the method comprising:

collecting static information pertaining to a business process management (BPM) application;

converting the static information into a first set of embeddings;

storing the static information and the first set of embeddings in a static information vector store;

detecting an error or a process visibility threshold violation with respect to a business process instance that is executed by the BPM application, the process visibility threshold violation being a violation of a key performance indicator (KPI) threshold defined for the business process instance in a process visibility application; and in response to detecting the error or the process visibility threshold violation:

collecting instance-specific information that is specific to the business process instance;

converting the instance-specific information into a second set of embeddings;

storing the instance-specific information and the second set of embeddings in an instance-specific vector store;

performing a semantic search of textual content of the error or the process visibility threshold violation on the static information vector store and the instance-specific vector store, the semantic search resulting in identification of one or more portions of the static information and/or the instance-specific information that are semantically relevant to the error or the process visibility threshold violation;

building a large language model (LLM) prompt that includes the textual content of the error or the process visibility threshold violation and the identified one or more portions;

providing the LLM prompt as input to an LLM, resulting in a natural language output from the LLM that is responsive to the error or the process visibility threshold violation; and causing the natural language output to be presented to a participant of the business process instance.

2. The method of claim 1 wherein the static information includes help documentation, technical troubleshooting documentation, release notes, and/or customer support tickets for the BPM application and/or a computing environment in which the BPM application is deployed.

3. The method of claim 1 wherein the instance-specific information includes log information, process visibility events, and/or user-uploaded documents for the business process instance.

4. The method of claim 3 wherein the process visibility events are collected from a process visibility events database maintained by the process visibility application.

5. The method of claim 1 wherein the collecting of the static information is performed in response to a release of a new version of the BPM application.

6. The method of claim 1 wherein converting the static information into the first set of embeddings comprises:

splitting the static information into a first plurality of text chunks; and for each text chunk in the first plurality of text chunks:

providing the text chunk as input to the LLM;

receiving from the LLM an embedding of the text chunk.

7. The method of claim 6 wherein converting the instance-specific information into the second set of embeddings comprises:

splitting the instance-specific information into a second plurality of text chunks; and for each text chunk in the second plurality of text chunks:

providing the text chunk as input to the LLM;

receiving from the LLM an embedding of the text chunk.

8. The method of claim 7 wherein performing the semantic search comprises:

creating an embedding of the textual content of the error or the process visibility threshold violation;

computing mathematical distances between the embedding and the first and second sets of embeddings;

determining one or more embeddings in the first and second sets of embeddings that are closest in distance to the embedding; and identifying one or more text chunks corresponding to the one or more embeddings as being the one or more portions of the static information and/or the instance-specific information that are semantically relevant to the error or the process visibility threshold violation.

9. The method of claim 1 wherein the LLM prompt includes a request for a solution or troubleshooting steps for the error or the process visibility threshold violation.

10. The method of claim 1 wherein the natural language output from the LLM is presented proactively to the participant of the business process instance, without requiring the participant to explicitly request it.

11. The method of claim 1 wherein the natural language output is presented in an administrative dashboard of the BPM application.

12. The method of claim 1 wherein the natural language output is presented in a process visibility dashboard of the process visibility application.

13. The method of claim 1 further comprising:

receiving, via a UI of the BPM application, a natural language query pertaining to the business process instance; and in response to the natural language query:

performing a semantic search of the natural language query on the static information vector store, the semantic search resulting in identification of one or more portions of the static information that are semantically relevant to the natural language query;

building a second LLM prompt that includes the natural language query and the identified one or more portions of the static information that are semantically relevant to the natural language query;

providing the second LLM prompt as input to the LLM, resulting in a second natural language output from the LLM that is responsive to the natural language query; and causing the second natural language output to be presented in the UI of the BPM application.

14. The method of claim 13 wherein the method further comprises, in response to the natural language query:

collecting further instance-specific information that is specific to the business process instance;

converting the further instance-specific information into a third set of embeddings; and storing the further instance-specific information and third set of embeddings in the instance-specific vector store.

15. The method of claim 14 wherein the semantic search is also performed on the instance-specific information vector store, resulting in identification of one or more portions of the instance-specific information and/or the further instance-specific information that are semantically relevant to the natural language query.

16. The method of claim 15 wherein the second LLM prompt further includes the one or more portions of the instance-specific information and/or the further instance-specific information that are semantically relevant to the natural language query.

17. A non-transitory computer readable storage medium having stored thereon instructions executable by one or more processors, the instructions causing the one or more processors to:

collect static information pertaining to a business process management (BPM) application;

convert the static information into a first set of embeddings;

store the static information and the first set of embeddings in a static information vector store;

detect an error or a process visibility threshold violation with respect to a business process instance that is executed by the BPM application, the process visibility threshold violation being a violation of a key performance indicator (KPI) threshold defined for the business process instance in a process visibility application; and in response to detecting the error or the process visibility threshold violation:

collect instance-specific information that is specific to the business process instance;

convert the instance-specific information into a second set of embeddings;

store the instance-specific information and the second set of embeddings in an instance-specific vector store;

perform a semantic search of textual content of the error or the process visibility threshold violation on the static information vector store and the instance-specific vector store, the semantic search resulting in identification of one or more portions of the static information and/or the instance-specific information that are semantically relevant to the error or the process visibility threshold violation;

build a large language model (LLM) prompt that includes the textual content of the error or the process visibility threshold violation and the identified one or more portions;

provide the LLM prompt as input to an LLM, resulting in a natural language output from the LLM that is responsive to the error or the process visibility threshold violation; and cause the natural language output to be presented to a participant of the business process instance.

18. The non-transitory computer readable storage medium of claim 17 wherein the static information includes help documentation, technical troubleshooting documentation, release notes, and/or customer support tickets for the BPM application and/or a computing environment in which the BPM application is deployed, and wherein the instance-specific information includes log information, process visibility events, and/or user-uploaded documents for the business process instance.

19. A computer system comprising:

one or more processors; and a computer readable storage medium having stored thereon program code that, when executed by the one or more processors, cause the one or more processors to:

collect static information pertaining to a business process management (BPM) application;

convert the static information into a first set of embeddings;

store the static information and the first set of embeddings in a static information vector store;

detect an error or a process visibility threshold violation with respect to a business process instance that is executed by the BPM application, the process visibility threshold violation being a violation of a key performance indicator (KPI) threshold defined for the business process instance in a process visibility application; and in response to detecting the error or the process visibility threshold violation:

collect instance-specific information that is specific to the business process instance;

convert the instance-specific information into a second set of embeddings;

store the instance-specific information and the second set of embeddings in an instance-specific vector store;

perform a semantic search of textual content of the error or the process visibility threshold violation on the static information vector store and the instance-specific vector store, the semantic search resulting in identification of one or more portions of the static information and/or the instance-specific information that are semantically relevant to the error or the process visibility threshold violation;

build a large language model (LLM) prompt that includes the textual content of the error or the process visibility threshold violation and the identified one or more portions;

provide the LLM prompt as input to an LLM, resulting in a natural language output from the LLM that is responsive to the error or the process visibility threshold violation; and cause the natural language output to be presented to a participant of the business process instance.

20. The computer system of claim 19 wherein the static information includes help documentation, technical troubleshooting documentation, release notes, and/or customer support tickets for the BPM application and/or a computing environment in which the BPM application is deployed, and wherein the instance-specific information includes log information, process visibility events, and/or user-uploaded documents for the business process instance.

* * * * *